May 22, 1951  G. W. STANLEY  2,554,069

OIL RING

Filed March 24, 1947

Inventor

Gordon W. Stanley

By *Clarence A. O'Brien*
*and Harvey B. Jacobson*
Attorneys

Patented May 22, 1951

2,554,069

UNITED STATES PATENT OFFICE 2,554,069

OIL RING

Gordon W. Stanley, Brandon, Manitoba, Canada

Application March 24, 1947, Serial No. 736,785

5 Claims. (Cl. 309—45)

This invention relates to improvements in oil rings for pistons.

An object of the invention is to provide an improved form of oil ring for pistons which will be provided with a vertical outer wall or surface and with one or more inwardly sloping faces or surfaces whereby oil from an engine cylinder wall will be wiped therefrom by said oil ring on the downward stroke of the piston and passed back through radially extending openings formed through the piston to drop back into the oil pan instead of being pumped up into the combustion chamber of the engine.

Another object of the invention is to provide a transversely split oil ring for pistons having a plurality of circumferentially disposed spaced raised shoulders with the portions of the lower surface of said ring between said shoulders being angled inwardly and upwardly from the lower and outer edge of said ring for directing oil wiped from a cylinder wall at an angle to and through openings extending from the inner surface of the ring supporting groove through the piston to drop back into the oil pan.

A further object of the invention is to provide a transversely split oil ring for pistons having a plurality of circumferentially disposed spaced raised shoulders with the portions of the upper and lower surfaces of said ring between said shoulders being oppositely and inwardly angled to converge at a central line at the inner edge of said ring.

A still further object of the invention is to provide an improved transversely split oil ring for pistons having a plurality of circumferentially disposed spaced raised shoulders with portions of the ring between said shoulders extending upwardly and inwardly approximately one-half way up the lower side of the ring, with the rear lower surface of the ring extending parallel to the flat top of said ring.

Another object of the invention is to provide an improved form of oil ring for pistons which will be associated with one or more steel spacer rings disposable either above or below, or above and below said oil ring, said spacer rings being made of harder steel than the metal forming the piston, whereby wear on the piston will be reduced to a minimum as the friction contact will be mainly upon the hard steel spacer rings.

A still further object of the invention is to provide an improved form of oil ring for pistons which will be highly efficient in operation, and relatively inexpensive to manufacture and produce.

Other objects will appear as the description proceeds.

In the accompanying drawings which form a part of this application,

Like characters of reference are used throughout the following specifications and the accompanying drawings to designate corresponding parts.

Figure 1:
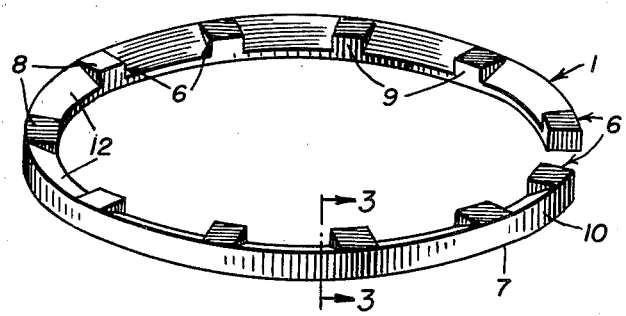
Figure 1 is an inverted perspective view of one form of the improved oil ring.

In carrying out the invention, there is provided an improved form and construction of a split oil ring, three types or modifications of said ring being illustrated, and each ring being generally designated by the reference numeral 1.

As usual, a piston 2 is formed with a circumferentially extending groove for receiving the oil ring 1, which is adapted to engage the inner cylindrical wall 4 of a cylinder 5, for wiping the oil from the cylinder wall on the downward stroke of the piston for lubricating said ring. Inwardly directed oil passages or openings 20 are formed through the piston wall to connect with the inner wall of said ring receiving groove.

In each of the modifications of the oil ring 1, there is provided a plurality of circumferentially disposed spaced raised shoulders generally indicated by the reference numeral 6, said shoulders having flat parallel extending upper and lower surfaces 7 and 8, respectively, and arcuate concentrically arranged inner and outer surfaces 9 and 10 on the inner periphery and outer periphery of said ring 1.

In the oil ring 1 illustrated in Figure 1 of the drawings, a flat upper surface 7 is provided, while the portions of the lower surface of the ring between the shoulders 6 formed thereon, slope outwardly and upwardly as at 12 to provide for the upper peripheral edge of the ring to engage and wipe oil from the inner wall 4 of the cylinder 5 which will then be passed through the passages or openings 20 in the piston 2 to fall back into the oil pan (not shown).

A hard steel spacer ring 13 will be disposed in the circumferentially extending groove 3 in the piston 2 above the ring 1 when disposed therein, to take up the frictional wear which would otherwise wear down the soft metal of the piston 2. The resiliency of the steel spacer ring 13 is such as to cause it to draw inwardly against the inner wall of the groove 3 rather than to expand outwardly to contact the inner wall 4 of the cylinder 5.

Figure 2:
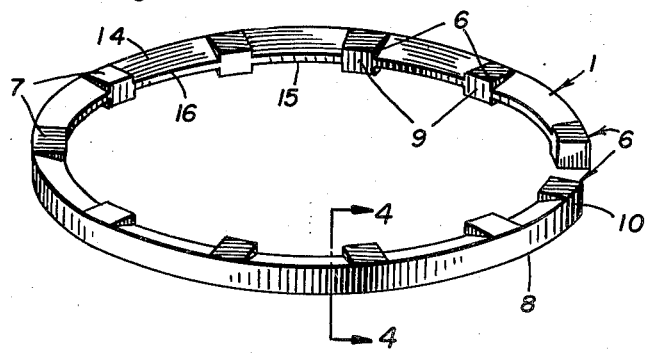
Figure 2 is a perspective view of a modified form of the improved oil ring having opposed inwardly extending sloping upper and lower surfaces.
Figure 3:
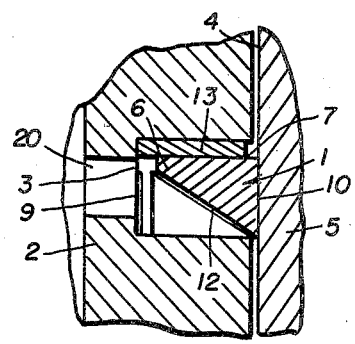
Figure 3 is a sectional view taken on the line 3—3 of Figure 1 when the ring is in normal position.
Figure 4:
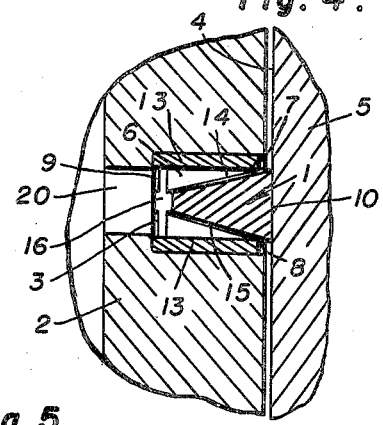
Figure 4 is a sectional view taken on the line 4—4 of Figure 2.

In the second modification of the oil ring 1 illustrated in Figure 2 of the drawings, the spaced raised shoulders 6 are provided as in the first mentioned form of oil ring, but in this instance, the portions of the body between the shoulders 6 incline inwardly and downwardly on the upper surface 14 of the oil ring 1, and the lower surface 15 of the oil ring 1 inclines inwardly and upwardly to converge with the upper surface 14 along a common central line 16 at the central edge of the oil ring 1. In this form of oil ring, the hard metal spacer rings 13 will be disposed above and below the ring 1 to engage the inner surface of the groove 3 in the piston 2, thereby permitting the oil ring 1 to wipe the oil from the wall 4 of the cylinder 5 on each upward and downward stroke of the piston 2 to be passed back through the ring and through the passages or openings 20 through the piston 2 to fall back into the oil pan (not shown).

Figure 5:
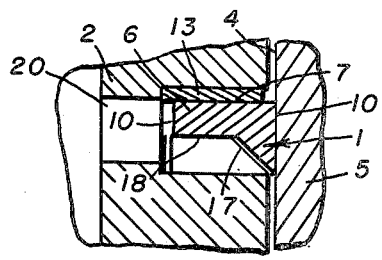
Figure 5 is a transverse sectional view through a modified form of oil ring whose lower surface slopes inwardly and upwardly approximately half-way up the height of the ring terminating in a flat lower rear surface.

In Figure 5 of the drawings, there is illustrated a third modification of the oil ring 1 which is provided with similar circumferentially disposed spaced raised shoulders 6, and the portions of the upper surface of the body between said shoulders 6 are sloped inwardly and upwardly to extend halfway of said ring as at 17, and said upper surface is then extended inwardly as at 18 to lie parallel to the flat side 8 of the oil ring 1. A single hard steel spacer ring 13 will be disposed upon the upper surface of the ring 1 to hug the inner surface of the groove 3 of the piston 2, as hereinbefore mentioned and described. In this construction, the oil from the wall 4 of the cylinder 5 will be wiped on the downward stroke of the piston 2 to lubricate said ring and to pass the excess oil from the cylinder wall through the ring and the passages or openings 20 in the piston to drop back into the oil pan (not shown).

From the foregoing description, it will be apparent that there has been devised and provided a highly efficient form of oil ring for pistons which will combine with one or more hard steel spacer rings, whereby the frictional wear usually absorbed by the piston, will be transmitted to the harder steel spacer ring or rings, thereby lessening the wear on the softer pistons and prolonging their useful life.

While the preferred embodiment of the instant invention has been illustrated and described, it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. In combination with a piston having radially extending oil passages and a connecting circumferentially disposed groove formed in its peripheral edge, an oil ring disposable therein comprising a transversely split ring body formed with a plurality of circumferentially disposed spaced raised shoulders having parallel upper and lower bearing surfaces and concentric arcuate inner and outer surfaces of an equal height, said ring being formed with a straight top surface between said shoulders, the lower surface of said ring between said shoulders sloping inwardly and upwardly from the lower and outer edge of said ring, and a hard steel spacer ring disposed in said groove in contact with the surfaces of said oil ring.

2. In combination with a piston having radially extending oil passages and a connecting circumferentially disposed groove formed in its peripheral edge, an oil ring disposable therein comprising a split ring body formed with a plurality of circumferentially disposed spaced raised shoulders having parallel upper and lower surfaces and concentric arcuate inner and outer surfaces, the upper and lower surfaces of said ring between said shoulders being inwardly angled to converge at the inner edge of said ring along a central medial line, and hard steel spacer rings disposed in said slot above and below said oil ring and in contact with the upper and lower surfaces thereof.

3. An oil ring for pistons having radially extending oil passages and a connecting circumferentially disposed groove formed in its peripheral edge comprising a split ring body formed with a plurality of circumferentially disposed spaced raised shoulders having parallel upper and lower surfaces and concentric arcuate inner and outer surfaces of an equal height, the upper and lower surfaces of said ring between said shoulders sloping inwardly and hard steel spacer rings disposed in said groove in contact with the surfaces of the ring.

4. An oil ring for pistons having radially extending oil passages and a connecting circumferentially disposed groove formed in its peripheral edge comprising a split oil ring body having a curved outer wall and a concentrically disposed inner wall, a plurality of circumferentially spaced bearing shoulders transversely disposed between the inner and outer wall and having parallel upper and lower surfaces, the upper and lower surfaces of said oil ring between the bearing shoulders being inclined downwardly and inwardly relative to the inner wall where the surfaces converge forming an upper and lower scraping edge on the outer wall of said oil ring, and a pair of hard steel spacer rings disposed in said groove in contact with the upper and lower surfaces of said oil ring.

5. An oil ring for pistons having radially extending oil passages and a connecting circumferentially disposed groove formed in its peripheral edge comprising a split ring body having a curved outer wall and a concentrically disposed inner wall, a plurality of circumferentially spaced bearing shoulders transversely disposed between the inner and outer wall and having straight parallel upper and lower bearing surfaces, the upper surface of the ring between the bearing surfaces being inclined inwardly and downwardly from the outer wall to the inner wall, the lower surface of the ring between the bearing surfaces being inclined inwardly and upwardly, said upper and lower surfaces of the ring converging at the reduced inner wall and defining opposed scraping edges on the outer wall, and a pair of hard steel spacer rings disposed in said groove in contact with the surfaces of said oil ring.

GORDON W. STANLEY.

REFERENCES CITED

The following references are of record in the file of this patent:

UNITED STATES PATENTS

| Number | Name | Date |
| --- | --- | --- |
| 1,572,690 | Seelert | Feb. 9, 1926 |
| 1,667,941 | Madsen | May 1, 1928 |
| 1,781,183 | Louis | Nov. 11, 1930 |
| 1,832,842 | Smith | Nov. 17, 1931 |
| 1,836,027 | Hellman | Dec. 15, 1931 |
| 2,079,977 | Wenzel | May 11, 1937 |
| 2,328,912 | Kotzback | Sept. 7, 1943 |